United States Patent
Park et al.

(10) Patent No.: US 9,856,954 B2
(45) Date of Patent: Jan. 2, 2018

(54) PLANETARY GEAR TRAIN OF AUTOMATIC TRANSMISSION FOR A VEHICLE

(71) Applicant: Hyundai Motor Company, Seoul (KR)

(72) Inventors: JongSool Park, Hwaseong-si (KR); Dong Hwan Hwang, Seoul (KR); Seong Wook Hwang, Gunpo-si (KR); Seongwook Ji, Ansan-si (KR); Chang Wook Lee, Suwon-si (KR); Hyun Sik Kwon, Seoul (KR); SeokJin Kim, Hwaseong-si (KR); KyeongHun Lee, Seoul (KR); Wonmin Cho, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 164 days.

(21) Appl. No.: 14/940,680

(22) Filed: Nov. 13, 2015

(65) Prior Publication Data

US 2017/0074373 A1  Mar. 16, 2017

(30) Foreign Application Priority Data

Sep. 14, 2015 (KR) .................. 10-2015-0129865

(51) Int. Cl.
*F16H 3/66* (2006.01)
(52) U.S. Cl.
CPC .............. *F16H 3/666* (2013.01); *F16H 3/66* (2013.01); *F16H 2200/0065* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

2013/0274058 A1* 10/2013 Beck .................... F16H 3/66
 475/275
2013/0274060 A1  10/2013 Beck et al.
(Continued)

FOREIGN PATENT DOCUMENTS

JP 2014-500463 A 1/2014
KR 10-2012-0132021 A 12/2012

*Primary Examiner* — Edwin A Young
(74) *Attorney, Agent, or Firm* — Morgan, Lewis & Bockius LLP

(57) ABSTRACT

A planetary gear train of automatic transmission may comprise an input shaft, an output shaft, first, second, third, and fourth planetary gear sets having first to twelfth rotating element, and six control elements disposed between one of the rotating elements and another or the input shaft, between one of the rotating elements and the output shaft, or between one of the rotating elements and a transmission housing, wherein the input shaft is directly connected with the third rotating element, the output shaft is connected with the eleventh rotating element continuously, the second rotating element is directly connected with the eleventh rotating element, the third rotating element is directly connected with the fourth rotating element, the fifth rotating element is directly connected with the ninth rotating element, the sixth rotating element is directly connected with the tenth rotating element, and the seventh rotating element is selectively connected with the transmission housing.

10 Claims, 2 Drawing Sheets

(56) References Cited

U.S. PATENT DOCUMENTS

2013/0345014 A1* 12/2013 Mellet ..................... F16H 3/62
  475/276
2014/0057753 A1* 2/2014 Hart ......................... F16H 3/66
  475/278
2015/0111690 A1 4/2015 Shim et al.

* cited by examiner

FIG. 2

| Transmission step | Transmission control element | | | | | | Gear ratio | Step ratio | Entire gear ratio |
|---|---|---|---|---|---|---|---|---|---|
| | B1 | B2 | B3 | C1 | C2 | C3 | | | |
| D1 | ● | | ● | | ● | | 5.646 | - | 9.2. (Tunable) |
| D2 | | | ● | ● | ● | | 3.430 | 1.646 | |
| D3 | ● | | ● | ● | | | 2.236 | 1.534 | |
| D4 | | | ● | ● | | ● | 1.625 | 1.376 | |
| D5 | ● | | | ● | | ● | 1.227 | 1.324 | |
| D6 | | | | ● | ● | ● | 1.000 | 1.227 | |
| D7 | ● | | | | ● | ● | 0.880 | 1.136 | |
| D8 | | ● | | | ● | ● | 0.743 | 1.184 | |
| D9 | ● | ● | | | | ● | 0.613 | 1.212 | |
| REV | ● | ● | ● | | | | -4.150 | - | - |

PLANETARY GEAR TRAIN OF AUTOMATIC TRANSMISSION FOR A VEHICLE

CROSS-REFERENCE TO RELATED APPLICATION

The present application claims priority of Korean Patent Application Number 10-2015-0129865 filed on Sep. 14, 2015, the entire contents of which application are incorporated herein for all purposes by this reference.

BACKGROUND OF INVENTION

Field of the Invention

The present invention relates to an automatic transmission for a vehicle, and more particularly, to a planetary gear train of an automatic transmission for a vehicle which implements 9 forward speeds and increases an entire gear ratio by a minimum configuration to improve power transmission performance and fuel efficiency and secure linearity of step ratios between transmission stages.

Description of Related Art

In recent years, a rise in oil price causes dashing into unlimited competition for enhancing fuel efficiency.

As a result, researches into reduction of a weight and the enhancement of the fuel efficiency through downsizing are conducted in the case of an engine and researches for simultaneously securing operability and fuel efficiency competitiveness through multistages are conducted in the case of an automatic transmission.

However, in the automatic transmission, as transmission steps increase, the number of internal components increases, and as a result, mountability, cost, weight, transmission efficiency, and the like may still deteriorate.

Accordingly, development of a planetary gear train which may bring about maximum efficiency with a small number of components may be important in order to increase a fuel efficiency enhancement effect through the multistages.

In this aspect, in recent years, 8 and 9-speed automated transmissions tend to be implemented and the research and development of a planetary gear train capable of implementing more transmission steps has also been actively conducted.

However, improvement effect of fuel efficiency is not so good in case of 8-speed automated transmission, because an entire gear ratio is maintained in a level of 6.5~7.5.

Therefore, development of a high efficiency automatic transmission implementing at least 9 speeds is required in that operation efficiency of an engine and drivability of a vehicle are deteriorated because linearity of step ratios between transmission stages can't be secured in case of enabling an entire gear ratio of an 8-speed automated transmission to be a level more than or equal to 9.0.

The information disclosed in this Background of the Invention section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to providing a planetary gear train of an automatic transmission for a vehicle which implements at least 9 forward speeds and at least 1 reverse speed transmission steps with a minimum configuration, improves power transmission efficiency and fuel efficiency through increasing an entire gear ratio, and secures linearity of step ratios between transmission stages.

In various aspects of the present invention, a planetary gear train of an automatic transmission for a vehicle may comprise an input shaft receiving rotary power of an engine, an output shaft outputting the rotary power with rotary speed changed, a first planetary gear set having a first, a second, and a third rotating element, a second planetary gear set having a fourth, a fifth, and a sixth rotating element, a third planetary gear set having a seventh, an eighth, and a ninth rotating element, a fourth planetary gear set having a tenth, a eleventh, and a twelfth rotating element, and six control elements disposed between one of the rotating elements and another or the input shaft, between one of the rotating elements and the output shaft, or between one of the rotating elements and a transmission housing, wherein the input shaft may be directly connected with the third rotating element, the output shaft may be connected with the eleventh rotating element all the time, the second rotating element may be directly connected with the eleventh rotating element, the third rotating element may be directly connected with the fourth rotating element, the fifth rotating element may be directly connected with the ninth rotating element, the sixth rotating element may be directly connected with the tenth rotating element, and the seventh rotating element may be selectively connected with the transmission housing, and wherein the planetary gear train may implement transmission steps of at least 9 forward speeds and at least one reverse speed while three control elements operate among the six control elements.

The eighth rotating element may be selectively connected with the transmission housing, the twelfth rotating element may be selectively connected with the transmission housing, the input shaft may be selectively connected with the eighth rotating element, the sixth rotating element may be selectively connected with the eighth rotating element, and the first rotating element may be selectively connected with the twelfth rotating element.

The first, the second, and the third rotating element of the first planetary gear set may be a sun gear, a planetary carrier, and a ring gear respectively, the fourth, the fifth, and the sixth rotating element of the second planetary gear set may be a sun gear, a ring gear, and a planetary carrier respectively, the seventh, the eighth, and the ninth rotating element of the third planetary gear set may be a sun gear, a planetary carrier, and a ring gear respectively, and the tenth, the eleventh, and the twelfth rotating element of the fourth planetary gear set may be a sun gear, a planetary carrier, and a ring gear respectively.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation table for each of transmission steps of respective control elements applied to an exemplary planetary gear train according to the present invention.

Figure 1:
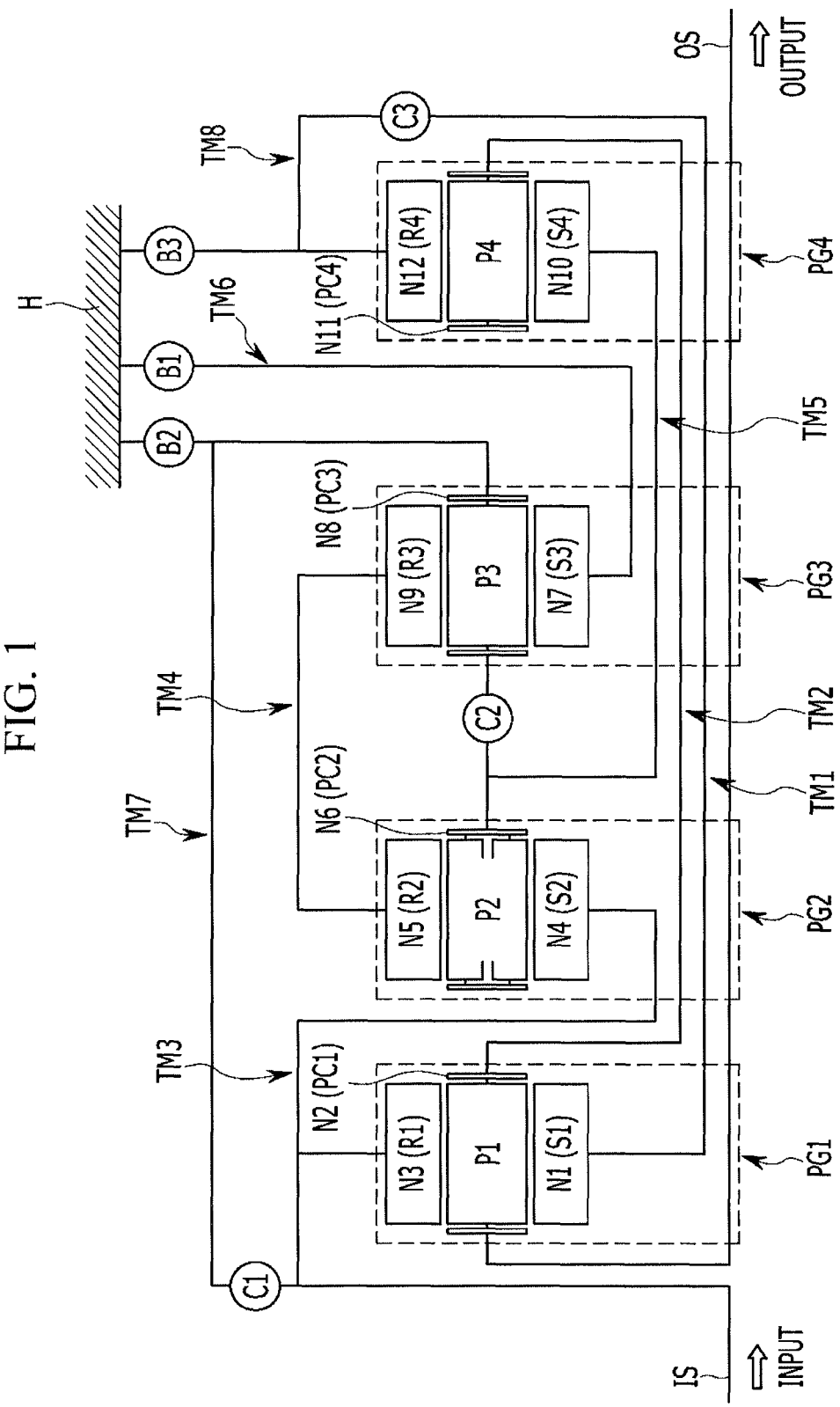
FIG. 1 is a schematic diagram of an exemplary planetary gear train according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

However, parts which are not related with the description are omitted for clearly describing the exemplary embodiments of the present invention and like reference numerals refer to like or similar elements throughout the specification.

In the following description, dividing names of components into first, second, and the like is to divide the names because the names of the components are the same as each other and an order thereof is not particularly limited.

FIG. 1 is a schematic diagram of a first exemplary planetary gear train according to an exemplary embodiment of the present invention.

Referring to FIG. 1, the planetary gear train according to various embodiments of the present invention includes a first, a second, a third, and a fourth planetary gear set PG1, PG2, PG3, and PG4 disposed on a same axis line, an input shaft IS, an output shaft OS, eight rotating shafts TM1 to TM8 that connect respective rotating elements of the first, second, third, and fourth planetary gear sets PG1, PG2, PG3, and PG4 to each other, six control elements C1 to C3 and B1 to B3, and a transmission housing H.

Further, rotary power input from the input shaft IS is transmitted by an inter-complementation operation of the first, second, third, and fourth planetary gear sets PG1, PG2, PG3, and PG4 to be output through the output shaft OS with rotary speed changed.

The respective simple planetary gear sets are disposed in an order of the first, the second, the third, and the fourth planetary gear set PG1, PG2, PG3, and PG4 starting from an engine side.

The input shaft IS is an input member and rotary power from a crankshaft of an engine is torque-converted through a torque converter to be input into the input shaft IS.

The output shaft OS as an output member is disposed on a same axis line as the input shaft IS and transmits transmitted driving power to a driving shaft through a differential.

The first planetary gear set PG1, which is a single-pinion planetary gear set, includes a first sun gear S1 which is a first rotating element N1, a first planetary carrier PC1 which is a second rotating element N2 and rotatably supports a first pinion P1 which engages externally with the first sun gear S1, and a first ring gear R1 which is a third rotating element N3 and engages internally with the first pinion P1 as rotating elements.

The second planetary gear set PG2, which is a double-pinion planetary gear set, includes a second sun gear S2 which is a fourth rotating element N4, a second ring gear R2 which is a fifth rotating element N5 and engages internally with a second pinion P2 externally engaged with the second sun gear S2, and a second planetary carrier PC2 which is a sixth rotating element N6 and supports the second pinion P2.

The third planetary gear set PG3, which is a single-pinion planetary gear set, includes a third sun gear S3 which is a seventh rotating element N7, a third planetary carrier PC3 which is an eighth rotating element N8 and supports a third pinion P3 which engages externally with the third sun gear S3, and a third ring gear R3 which is a ninth rotating element N9 and engages internally with the third pinion P3.

The fourth planetary gear set PG4, which is a single-pinion planetary gear set, includes a fourth sun gear S4 which is a tenth rotating element N10, a fourth planetary carrier PC4 which is a eleventh rotating element N11 and rotatably supports a fourth pinion P4 which engages externally with the fourth sun gear S4, and a fourth ring gear R4 which is a twelfth rotating element N12 and engages internally with the fourth pinion P4.

In the first, second, third, fourth planetary gear sets PG1, PG2, PG3, PG4, the second rotating element N2 is directly connected with the eleventh rotating element N11, the third rotating element N3 is directly connected with the fourth rotating element N4, the fifth rotating element N5 is directly connected with the ninth rotating element N9, and the sixth rotating element N6 is directly connected with the tenth rotating element N10, and the planetary gear sets have a total of eight rotating shafts TM1 to TM8.

Configurations of the eight rotating shafts TM1 to TM8 will be described below.

The first rotating shaft TM1 includes the first rotating element N1 (the first sun gear S1).

The second rotating shaft TM2 includes the second rotating element N2 (the first planetary carrier PC1) and the eleventh rotating element N11 (the fourth planetary carrier PC4) and operates continuously as an output element by being directly connected with the output shaft OS.

The third rotating shaft TM3 includes the third rotating element N3 (the first ring gear R1) and the fourth rotating element N4 (the second sun gear S2) and operates continuously as an input element by being directly connected with the input shaft IS.

The fourth rotating shaft TM4 includes the fifth rotating element N5 (the second ring gear R2) and the ninth rotating element N9 (the third ring gear R3).

The fifth rotating shaft TM5 includes the sixth rotating element N6 (the second planetary carrier PC2) and the tenth rotating element N10 (the fourth sun gear S4).

The sixth rotating shaft TM6 includes the seventh rotating element N7 (the third sun gear S3) and is selectively connected with the transmission housing H.

The seventh rotating shaft TM7 includes the eighth rotating element N8 (the third planetary carrier PC3) and is selectively connected with the third rotating shaft TM3 and the transmission housing H.

The eighth rotating shaft TM8 includes the twelfth rotating element N12 (the fourth ring gear R4) and is selectively connected with the first rotating shaft TM1 and the transmission housing H.

In addition, three clutches C1, C2, and C3 which are control elements are disposed at portions selectively connecting the rotating shafts respectively, among the rotating shafts TM1 to TM8.

Further, three brakes B1, B2, and B3 which are other control elements are disposed at portions selectively connecting the transmission housing H and the rotating shafts respectively, among the rotating shafts TM1 to TM8.

Layout positions of the six control elements C1 to C3 and B1 to B3 will be described below.

The first clutch C1 is interposed between the third rotating shaft TM3 and the seventh rotating shaft TM7 and operates such that the third rotating shaft TM3 and the seventh rotating shaft TM7 selectively operate as one body.

The second clutch C2 is interposed between the fifth rotating shaft TM5 and the seventh rotating shaft TM7 and operates such that the fifth rotating shaft TM5 and the seventh rotating shaft TM7 selectively operate as one body.

The third clutch C3 is interposed between the first rotating shaft TM1 and the eighth rotating shaft TM8 and operates such that the first rotating shaft TM1 and the eighth rotating shaft TM8 selectively operate as one body.

The first brake B1 is interposed between the sixth rotating shaft TM6 and the transmission housing H and operates such that the sixth rotating shaft TM6 can selectively operate as a fixing body.

The second brake B2 is interposed between the seventh rotating shaft TM7 and the transmission housing H and operates such that the seventh rotating shaft TM7 can selectively operate as a fixing body.

The third brake B3 is interposed between the eighth rotating shaft TM8 and the transmission housing H and operates such that the eighth rotating shaft TM8 can selectively operate as a fixing body.

The respective control elements constituted by the first, the second, and the third clutch C1, C2, and C3 and the first, the second, and the third brake B1, B2, and B3 as described above may be configured by multiple-disk hydraulic friction joining units which are friction-joined by hydraulic pressure.

FIG. 2 is an operation table for each of transmission steps of respective control elements applied to an exemplary planetary gear train according to an exemplary embodiment of the present invention.

As illustrated in FIG. 2, a transmission is performed while three control elements operate in the respective transmission steps, in an exemplary planetary gear train according to an exemplary embodiment of the present invention.

In a first forward transmission step D1, the second clutch C2 and the first and the third brake B1 and B3 simultaneously operate.

As a result, an input is made into the third rotating shaft TM3 in a state of the fifth rotating shaft TM5 and the seventh rotating shaft TM7 being connected by an operation of the second clutch C2, and the first forward transmission step D1 is performed and an output is outputted through the output shaft OS including the second rotating shaft TM2 while the sixth rotating shaft TM6 and the eighth rotating shaft TM8 operate as fixing elements by an operation of the first and the third brake B1 and B3.

In a second forward transmission step D2, the first and the second clutch C1 and C2 and the third brake B3 simultaneously operate.

As a result, an input is made into the third rotating shaft TM3 in a state of the third rotating shaft TM3 and the seventh rotating shaft TM7 being connected by an operation of the first clutch C1 and the fifth rotating shaft TM5 and the seventh rotating shaft TM7 being connected by an operation of the second clutch C2, and the second forward transmission step D2 is performed and an output is outputted through the output shaft OS including the second rotating shaft TM2 while the eighth rotating shaft TM8 operates as a fixing element by an operation of the third brake B3.

In a third forward transmission step D3, the first clutch C1 and the first and the third brake B1 and B3 simultaneously operate.

As a result, an input is made into the third rotating shaft TM3 in a state of the third rotating shaft TM3 and the seventh rotating shaft TM7 being connected by an operation of the first clutch C1, and the third forward transmission step D3 is performed and an output is outputted through the output shaft OS including the second rotating shaft TM2 while the sixth rotating shaft TM6 and the eighth rotating shaft TM8 operated as fixing elements by an operation of the first and the third brake B1 and B3.

In a fourth forward transmission step D4, the first and the third clutch C1 and C3 and the third brake B3 simultaneously operate.

As a result, an input is made into the third rotating shaft TM3 in a state of the third rotating shaft TM3 and the seventh rotating shaft TM7 being connected by an operation of the first clutch C1 and the first rotating shaft TM1 and the eighth rotating shaft TM8 being connected by an operation of the third clutch C3, and the fourth forward transmission step D4 is performed and an output is outputted through the output shaft OS including the second rotating shaft TM2 while the eighth rotating shaft TM8 operates as a fixing element by an operation of the third brake B3.

In a fifth forward transmission step D5, the first and the third clutch C1 and C3 and the first brake B1 simultaneously operate.

As a result, an input is made into the third rotating shaft TM3 in a state of the third rotating shaft TM3 and the seventh rotating shaft TM7 being connected by an operation of the first clutch C1 and the first rotating shaft TM1 and the eighth rotating shaft TM8 being connected by an operation of the third clutch C3, and the fifth forward transmission step D5 is performed and an output is outputted through the output shaft OS including the second rotating shaft TM2 while the sixth rotating shaft TM6 operates as a fixing element by an operation of the first brake B1.

In a sixth forward transmission step D6, the first, the second, and the third clutch C1, C2, and C3 simultaneously operate.

As a result, the sixth forward transmission step D6 is performed in which an input is intactly outputted in a state of the first, the second, the third, and the fourth planetary gear set PG1, PG2, PG3, and PG4 being directly connected by virtue of the third rotating shaft TM3 and the seventh rotating shaft TM7 being connected by an operation of the first clutch C1, the fifth rotating shaft TM5 and the seventh rotating shaft TM7 being connected by an operation of the second clutch C2, and the first rotating shaft TM1 and the eighth rotating shaft TM8 being connected by an operation of the third clutch C3, and an output is outputted through the output shaft OS including the second rotating shaft TM2.

In a seventh forward transmission step D7, the second and the third clutch C2 and C3 and the first brake B1 simultaneously operate.

As a result, an input is made into the third rotating shaft TM3 in a state of the fifth rotating shaft TM5 and the seventh rotating shaft TM7 being connected by an operation of the second clutch C2 and the first rotating shaft TM1 and the eighth rotating shaft TM8 being connected by an operation of the third clutch C3, and the seventh forward transmission step D7 is performed and an output is outputted through the output shaft OS including the second rotating shaft TM2 while the sixth rotating shaft TM6 operates as a fixing element by an operation of the first brake B1.

In an eighth forward transmission step D8, the second and the third clutch C2 and C3 and the second brake B2 simultaneously operate.

As a result, an input is made into the third rotating shaft TM3 in a state of the fifth rotating shaft TM5 and the seventh rotating shaft TM7 being connected by an operation of the second clutch C2 and the first rotating shaft TM1 and the eighth rotating shaft TM8 being connected by an operation of the third clutch C3, and the eighth forward transmission step D8 is performed and an output is outputted through the output shaft OS including the second rotating shaft TM2 while the seventh rotating shaft TM7 operates as a fixing element by an operation of the second brake B2.

In a ninth forward transmission step D9, the third clutch C3 and the first and the second brake B1 and B2 simultaneously operate.

As a result, the ninth forward transmission step D9 is performed and an output is outputted through the output shaft OS including the second rotating shaft TM2 while the sixth rotating shaft TM6 and the seventh rotating shaft TM7 operate as fixing elements by an operation of the first and the second brake B1 and B2 in a state of the first rotating shaft TM1 and the eighth rotating shaft TM8 being connected by an operation of the third clutch C3.

In a reverse transmission step REV, the first, the second, and the third brake B1, B2, and B3 simultaneously operate.

As a result, the reverse transmission step REV is performed and an output is outputted through the output shaft OS including second rotating shaft TM2 while the sixth, the seventh, and the eighth rotating shaft TM6, TM7, and TM8 operate as fixing elements by an operation of the first, the second, and the third brake B1, B2, and B3 in a state of an input being made into the third rotating shaft TM3.

As described above, in the planetary gear train according to various embodiments of the present invention, four planetary gear sets PG1, PG2, PG3, and PG4 may implement at least 9 forward speeds and at least 1 reverse speed transmission steps through the operation-control of three clutches C1, C2, and C3 and three brakes B1, B2, and B3.

Further, drivability such as acceleration before and after a speed change and rhythmic feeling of engine speed can be improved because all the step ratios except 2 step ratios of forward 6 to 7 and forward 7 to 8 are greater than 1.2 and thereby linearity is secured.

In addition, operation efficiency of an engine can be maximized because an entire gear ratio is secured to be equal to or greater than 9.0.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft receiving a rotary power of an engine;
   an output shaft outputting the rotary power with rotary speed changed;
   a first planetary gear set having a first rotating element, a second, rotating element and a third rotating element;
   a second planetary gear set having a fourth rotating element, a fifth rotating element, and a sixth rotating element;
   a third planetary gear set having a seventh rotating element, an eighth rotating element, and a ninth rotating element;
   a fourth planetary gear set having a tenth rotating element, a eleventh rotating element, and a twelfth rotating element; and
   six control elements disposed between one of the rotating elements and another or the input shaft, between one of the rotating elements and the output shaft, or between one of the rotating elements and a transmission housing,
   wherein the input shaft is directly connected with the third rotating element,
   wherein the output shaft is connected with the eleventh rotating element continuously,
   wherein the second rotating element is directly connected with the eleventh rotating element,
   wherein the third rotating element is directly connected with the fourth rotating element,
   wherein the fifth rotating element is directly connected with the ninth rotating element,
   wherein the sixth rotating element is directly connected with the tenth rotating element, and
   wherein the seventh rotating element is selectively connected with the transmission housing, and
   wherein the planetary gear train implements transmission steps of at least 9 forward speeds and at least one reverse speed while three control elements operate among the six control elements.

2. The planetary gear train of claim 1, wherein
   the eighth rotating element is selectively connected with the transmission housing,
   the twelfth rotating element is selectively connected with the transmission housing,
   the input shaft is selectively connected with the eighth rotating element,
   the sixth rotating element is selectively connected with the eighth rotating element, and
   the first rotating element is selectively connected with the twelfth rotating element.

3. The planetary gear train of claim 1, wherein
   the first rotating element, the second rotating element, and the third rotating element of the first planetary gear set are a sun gear, a planetary carrier, and a ring gear respectively,
   the fourth rotating element, the fifth rotating element, and the sixth rotating element of the second planetary gear set are a sun gear, a ring gear, and a planetary carrier respectively,
   the seventh rotating element, the eighth rotating element, and the ninth rotating element of the third planetary gear set are a sun gear, a planetary carrier, and a ring gear respectively, and
   the tenth rotating element, the eleventh rotating element, and the twelfth rotating element of the fourth planetary gear set are a sun gear, a planetary carrier, and a ring gear respectively.

4. A planetary gear train of an automatic transmission for a vehicle comprising:
an input shaft receiving a rotary power of an engine;
an output shaft outputting the rotary power with rotary speed changed;
a first planetary gear set having a first rotating element, a second rotating element, and a third rotating element;
a second planetary gear set having a fourth rotating element, a fifth rotating element, and a sixth rotating element;
a third planetary gear set having a seventh rotating element, an eighth rotating element, and a ninth rotating element;
a fourth planetary gear set having a tenth, a eleventh, and a twelfth rotating element;
six control elements disposed between one of the rotating elements and another or the input shaft, between one of the rotating elements and the output shaft, or between one of the rotating elements and a transmission housing;
a first rotating shaft including the first rotating element;
a second rotating shaft including the second rotating element and the eleventh rotating element and directly connected with the output shaft;
a third rotating shaft including the third rotating element and the fourth rotating element and directly connected with the input shaft;
a fourth rotating shaft including the fifth rotating element and the ninth rotating element;
a fifth rotating shaft including the sixth rotating element and the tenth rotating element;
a sixth rotating shaft including the seventh rotating element and selectively connected with the transmission housing;
a seventh rotating shaft including the eighth rotating element and selectively connected with the third rotating shaft and the transmission housing; and
an eighth rotating shaft including the twelfth rotating element and selectively connected with the first rotating shaft and the transmission housing.

5. The planetary gear train of claim 4, wherein
the first planetary gear set is a single-pinion planetary gear set, the first rotating element is a first sun gear, the second rotating element is a first planetary carrier, and the third rotating element is a first ring gear,
wherein the second planetary gear set is a double-pinion planetary gear set, the fourth rotating element is a second sun gear, the fifth rotating element is a second ring gear, and the sixth rotating element is a second planetary carrier,
wherein the third planetary gear set is a single-pinion planetary gear set, the seventh rotating element is a third sun gear, the eighth rotating element is a third planetary carrier, and the ninth rotating element is a third ring gear, and
wherein the fourth planetary gear set is a single-pinion planetary gear set, the tenth rotating element is a fourth sun gear, the eleventh rotating element is a fourth planetary carrier, and the twelfth rotating element is a fourth ring gear.

6. The planetary gear train of claim 4, wherein the six control elements comprise:
a first clutch selectively connecting the third rotating shaft and the seventh rotating shaft;
a second clutch selectively connecting the fifth rotating shaft and the seventh rotating shaft;
a third clutch selectively connecting the first rotating shaft and the eighth rotating shaft;
a first brake selectively connecting the sixth rotating shaft and the transmission housing;
a second brake selectively connecting the seventh rotating shaft and the transmission housing; and
a third brake selectively connecting the eighth rotating shaft and the transmission housing.

7. The planetary gear train of claim 6, wherein transmission steps implemented by selectively operating the six control elements include:
a first forward transmission step implemented by simultaneously operating the second clutch and the first and the third brake;
a second forward transmission step implemented by simultaneously operating the first and the second clutch and the third brake;
a third forward transmission step implemented by simultaneously operating the first clutch and the first and the third brake;
a fourth forward transmission step implemented by simultaneously operating the first and the third clutch and the third brake;
a fifth forward transmission step implemented by simultaneously operating the first and the third clutch and the first brake;
a sixth forward transmission step implemented by simultaneously operating the first, the second, and the third clutch;
a seventh forward transmission step implemented by simultaneously operating the second and the third clutch and the first brake;
an eighth forward transmission step implemented by simultaneously operating the second and the third clutch and the second brake;
a ninth forward transmission step implemented by simultaneously operating the third clutch and the first and the second brake; and
a reverse transmission step implemented by simultaneously operating the first, the second, and the third brake.

8. A planetary gear train of an automatic transmission for a vehicle comprising:
an input shaft receiving a rotary power of an engine;
an output shaft outputting the rotary power with rotary speed changed;
a first planetary gear set which is a single-pinion planetary gear set, the first planetary gear set having a first rotating element, a second rotating element, and a third rotating element;
a second planetary gear set which is a double-pinion planetary gear set, the second planetary gear set having a fourth rotating element, a fifth rotating element, and a sixth rotating element;
a third planetary gear set which is a single-pinion planetary gear set, the third planetary gear set having a seventh rotating element, an eighth rotating element, and a ninth rotating element;
a fourth planetary gear set which is a single-pinion planetary gear set, the fourth planetary gear set having a tenth, an eleventh, and a twelfth rotating element;
a first rotating shaft including the first rotating element;
a second rotating shaft including the second rotating element and the eleventh rotating element and directly connected with the output shaft;

a third rotating shaft including the third rotating element and the fourth rotating element and directly connected with the input shaft;

a fourth rotating shaft including the fifth rotating element and the ninth rotating element;

a fifth rotating shaft including the sixth rotating element and the tenth rotating element;

a sixth rotating shaft including the seventh rotating element and selectively connected with a transmission housing;

a seventh rotating shaft including the eighth rotating element and selectively connected with the third rotating shaft and the transmission housing;

an eighth rotating shaft including the twelfth rotating element and selectively connected with the first rotating shaft and the transmission housing;

a first clutch selectively connecting the third rotating shaft and the seventh rotating shaft;

a second clutch selectively connecting the fifth rotating shaft and the seventh rotating shaft;

a third clutch selectively connecting the first rotating shaft and the eighth rotating shaft;

a first brake selectively connecting the sixth rotating shaft and the transmission housing;

a second brake selectively connecting the seventh rotating shaft and the transmission housing; and a third brake selectively connecting the eighth rotating shaft and the transmission housing.

9. The planetary gear train of claim 8, wherein the first rotating element is a first sun gear, the second rotating element is a first planetary carrier, and the third rotating element is a first ring gear, wherein the fourth rotating element is a second sun gear, the fifth rotating element is a second ring gear, and the sixth rotating element is a second planetary carrier, wherein the seventh rotating element is a third sun gear, the eighth rotating element is a third planetary carrier, and the ninth rotating element is a third ring gear, and wherein the tenth rotating element is a fourth sun gear, the eleventh rotating element is a fourth planetary carrier, and the twelfth rotating element is a fourth ring gear.

10. The planetary gear train of claim 8, wherein transmission steps implemented by selectively operating the three clutches and the three brakes include:

a first forward transmission step implemented by simultaneously operating the second clutch and the first and the third brake;

a second forward transmission step implemented by simultaneously operating the first and the second clutch and the third brake;

a third forward transmission step implemented by simultaneously operating the first clutch and the first and the third brake;

a fourth forward transmission step implemented by simultaneously operating the first and the third clutch and the third brake;

a fifth forward transmission step implemented by simultaneously operating the first and the third clutch and the first brake;

a sixth forward transmission step implemented by simultaneously operating the first, the second, and the third clutch;

a seventh forward transmission step implemented by simultaneously operating the second and the third clutch and the first brake;

an eighth forward transmission step implemented by simultaneously operating the second and the third clutch and the second brake;

a ninth forward transmission step implemented by simultaneously operating the third clutch and the first and the second brake; and a reverse transmission step implemented by simultaneously operating the first, the second, and the third brake.

\* \* \* \* \*